United States Patent
Fournier et al.

(10) Patent No.: US 9,487,407 B2
(45) Date of Patent: Nov. 8, 2016

(54) PROCESS FOR PREPARING PRECIPITATED SILICA COMPRISING A STEP OF HIGH TEMPERATURE SPALLING

(71) Applicant: RHODIA OPERATIONS, Paris (FR)

(72) Inventors: Elise Fournier, Caluire et Cuire (FR); Sylvaine Neveu, Paris (FR); Joël Racinoux, Rochetaillee sur Saone (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 14/386,069

(22) PCT Filed: Mar. 21, 2013

(86) PCT No.: PCT/EP2013/055973
§ 371 (c)(1),
(2) Date: Sep. 18, 2014

(87) PCT Pub. No.: WO2013/139932
PCT Pub. Date: Sep. 26, 2013

(65) Prior Publication Data
US 2015/0078979 A1    Mar. 19, 2015

(30) Foreign Application Priority Data
Mar. 22, 2012    (FR) .................... 12 52589

(51) Int. Cl.
*C01B 33/12*    (2006.01)
*C01B 33/187*    (2006.01)
*C01B 33/193*    (2006.01)

(52) U.S. Cl.
CPC ........... *C01B 33/187* (2013.01); *C01B 33/193* (2013.01)

(58) Field of Classification Search
CPC .................................................. C01B 33/193
USPC ................................................ 423/335, 339
See application file for complete search history.

(56) References Cited

U.S. PATENT DOCUMENTS

| | | | |
|---|---|---|---|
| 5,403,570 A * | 4/1995 | Chevallier et al. | ........... 423/339 |
| 5,871,867 A | 2/1999 | Rausch et al. | |
| 5,882,617 A | 3/1999 | Chevallier et al. | |
| 6,335,396 B1 | 1/2002 | Chevallier et al. | |
| 6,468,493 B1 | 10/2002 | Chevallier et al. | |
| 6,761,867 B1 | 7/2004 | Prat et al. | |
| 2005/0032965 A1 | 2/2005 | Valero | |
| 2006/0147546 A1 | 7/2006 | Ferlin et al. | |
| 2011/0178227 A1 | 7/2011 | Allain et al. | |
| 2012/0329937 A1 * | 12/2012 | Valero | ........... 524/493 |
| 2013/0171051 A1 | 7/2013 | Clouin et al. | |

FOREIGN PATENT DOCUMENTS

| | | | | |
|---|---|---|---|---|
| EP | 0520862 A1 | 12/1992 | | |
| EP | 0754650 A1 | 1/1997 | | |
| JP | 20050537020 A | 12/2005 | | |
| WO | WO 95/09127 A1 | 4/1995 | | |
| WO | WO 95/09128 A1 | 4/1995 | | |
| WO | WO 96/01787 A1 | 1/1996 | | |
| WO | WO 98/54090 A1 | 12/1998 | | |
| WO | WO 03/016215 A1 | 2/2003 | | |
| WO | WO 2009/112458 A1 | 9/2009 | | |
| WO | WO2011/0076716 | * | 6/2010 | ............. C01B 33/12 |
| WO | WO 2012/010712 A1 | 1/2012 | | |
| WO | WO 2013/139930 A1 | 9/2013 | | |
| WO | WO 2013/139933 A1 | 9/2013 | | |
| WO | WO 2013/139934 A1 | 9/2013 | | |

OTHER PUBLICATIONS

Easton, Chemical Analysis of Silicate Rocks, 1972, Elsevier, 1, 75-78.*
U.S. Appl. No. 14/386,012, Sylvaine Neveu, et al.
U.S. Appl. No. 14/386,015, Sylvaine Neveu, et al.
U.S. Appl. No. 14/386,093, Sylvaine Neveu, et al.

* cited by examiner

*Primary Examiner* — Matthew E Hoban
*Assistant Examiner* — James Fiorito

(57) ABSTRACT

A process for preparing precipitated silica comprising a reaction of a silicate with an acidifying agent to obtain a suspension of precipitated silica (S1), followed by a step of separation to obtain a cake, a step of spalling said cake to obtain a suspension of precipitated silica (S2) and a step of drying said suspension, wherein the spalling step is carried out at a temperature of between 50 and 120° C.

14 Claims, No Drawings

PROCESS FOR PREPARING PRECIPITATED SILICA COMPRISING A STEP OF HIGH TEMPERATURE SPALLING

CROSS-REFERENCE TO RELATED APPLICATIONS

The present application is a U.S. national stage entry under 35 U.S.C. §371 of International Application No. PCT/EP2013/055973 filed Mar. 21, 2013, which claims priority to French Application No. 12.52589 filed on Mar. 22, 2012, the whole content of this application being herein incorporated by reference for all purposes.

The present invention relates to an improved process for the preparation of precipitated silica.

It is known to employ precipitated silicas as catalyst support, as absorbent for active materials (in particular supports for liquids, for example used in food, such as vitamins (especially vitamin E) or choline chloride), as viscosifying, texturizing or anticaking agent, as battery separator component, or as additive for toothpaste or paper.

It is also possible to employ precipitated silicas as reinforcing filler in silicone matrices (for example for covering electrical cables) or in compositions based on natural or synthetic polymer(s), in particular on elastomer(s), especially diene elastomer(s), for example for footwear soles, floor coverings, gas barriers, flame-retardant materials and also engineering components, such as cableway rollers, seals for domestic electrical appliances, seals for liquid or gas pipes, braking system seals, sheathings, cables and transmission belts.

Precipitated silica has in particular been used for a long time as white reinforcing filler in elastomers and especially in tyres.

Precipitated silica is generally prepared by a precipitation reaction between a silicate, in particular an alkali metal silicate, and an acidifying agent, followed by a step of separation by filtration, in order to obtain a filtration cake, and by a step of washing said cake, then by an optional step of disintegrating the filtration cake and by a step of drying said cake, for example by atomization.

In the context of certain processes for the preparation of precipitated silica, the viscosity of the filtration cakes obtained during the process is very high and the disintegrating step can only be carried out with significant mechanical energy. The addition of water can be one solution as it contributes to reducing the viscosity. However, the addition of water proves to be harmful to the productivity of the drying, insofar as, in order to dry the same amount of silica, it is necessary to remove more water.

Furthermore, introducing mechanical energy in the disintegrating step can result in an excessively large reduction in the particle size of the silica, which may lead to an excessively cohesive silica after drying, which may then not be suitable for being dispersed in elastomeric matrices, for example.

In the context of the processes of the state of the art, the energy consumption is high. Drying is the main source of energy consumption and thus represents a fairly high cost.

There thus exists a need in terms of reduction in energy consumption and thus, for example, in the context of the drying operations.

Thus, one of the objectives of the present invention consists in providing a process for the preparation of precipitated silica which makes it possible to limit the energy costs, in particular in terms of drying.

One of the objectives of the invention is in particular to provide an alternative to the known processes for the preparation of precipitated silica which is economical and simple to carry out.

Another objective of the present invention preferably consists in providing a process which makes it possible to increase the productivity of the process for the preparation of precipitated silica, in particular at the drying step, advantageously while not degrading the properties of the precipitated silica obtained, in particular its dispersibility, especially in elastomers.

Another objective of the present invention is to prepare, during the process, silica suspensions having high solids contents while retaining an equivalent suspension quality, without requiring additional mechanical energy.

The present invention thus relates to a process for the preparation of precipitated silica comprising the reaction of a silicate with an acidifying agent, in order to obtain a suspension of precipitated silica (S1), followed by a separation step, in order to obtain a cake, by a step of disintegrating said cake, in order to obtain a suspension of precipitated silica (S2), and by a step of drying this suspension, and in which the disintegrating step is carried out under hot conditions, in this case at a temperature of between 50 and 120° C.

Preferably, the disintegrating step of the process according to the invention is carried out at a temperature of between 50 and 100° C., in particular between 60 and 100° C., especially between 70 and 90° C., for example between 75 and 85° C. The disintegrating step can be carried out at a temperature of 80° C.

According to the invention, the disintegrating step can be carried out under pressure.

According to one embodiment, the disintegrating step is carried out at atmospheric pressure.

Typically, the disintegrating step can be carried out at a high temperature of 50 to 120° C. by addition of steam or by heating.

According to one embodiment of the invention, the disintegrating step can comprise the addition of steam.

According to another embodiment of the invention, the disintegrating step can comprise a heating step. Typically, the heating step can be carried out in the disintegrator (or chamber where the disintegrating step is carried out).

According to the present invention, the disintegrating step can comprise a preliminary step of preheating the filtration cake, in particular before heating.

In particular, the filtration cake can be preheated for from 1 minute to 10 hours, preferably from 30 minutes to 5 hours, preferably from 1 to 5 hours and, for example, for approximately 3 hours.

Preferably, the optional preheating of the filtration cake is carried out at a temperature identical to or substantially identical to the temperature at which the disintegrating step will be carried out.

In particular, the process according to the present invention thus comprises the following steps:
  at least one silicate is reacted (precipitation reaction) with at least one acidifying agent, so as to obtain a suspension of precipitated silica (S1),
  a solid/liquid separation step, more particularly a filtration step, is carried out in order to obtain a solid product, also denoted "filtration cake",
  said filtration cake is subjected to a disintegrating operation at a temperature as indicated above, in this case at a temperature of between 50 and 120° C., in order to obtain a suspension of precipitated silica (S2), and
  the product thus obtained is dried, preferably by atomization.

The disintegrating operation is a fluidification or liquefaction operation, in which the filtration cake is rendered liquid, the precipitated silica being once again in suspension. In general, this operation makes it possible in particular to lower the viscosity of the suspension to be subsequently dried. This operation can thus be carried out by subjecting the filtration cake to a chemical action, for example by addition of an aluminum compound, such as sodium aluminate, and/or of acid, advantageously coupled with a mechanical action which generally brings about a reduction in the particle size of the suspended silica (for example, by passing through a continuously stirred tank or through a mill of colloid type). The suspension (in particular aqueous suspension) obtained after disintegrating exhibits a relatively low viscosity.

In general, in the context of the process of the invention, the product (filtration cake) subjected to the disintegrating step can exhibit a solids content of at least 10% by weight (in particular of between 10% and 40% by weight, for example of between 10% and 35% by weight), preferably of at least 15% by weight (in particular of between 15% and 40% by weight, for example of between 15% and 35% by weight) and more preferably still of at least 18% by weight, in particular of between 18% and 40% by weight, especially of between 20% and 35% by weight, for example between 20% and 30% by weight. In particular, the product (filtration cake) treated by the disintegrating step of the process according to the invention can exhibit a solids content of at least 25% by weight, in particular of between 25% and 35% by weight, for example of between 25% and 30% by weight.

In the context of the process of the invention, the duration of the disintegrating step (duration of the optional preheating step not included) can be between 5 and 120 minutes, preferably between 15 and 60 minutes, in particular between 15 and 40 minutes. This duration can in particular be between 15 and 35 minutes, for example between 20 and 35 minutes.

The suspension of precipitated silica (S2) obtained on conclusion of the disintegrating step generally exhibits a solids content of at least 10% by weight (in particular of between 10% and 40% by weight, for example of between 10% and 35% by weight), preferably of at least 15% by weight (in particular of between 15% and 40% by weight, for example of between 15% and 35% by weight) and more preferably still of at least 18% by weight, especially of between 18% and 40% by weight, especially of between 20% and 35% by weight, for example between 20% and 30% by weight. In particular, the suspension (S2) obtained on conclusion of the disintegrating step of the process according to the invention can exhibit a solids content of at least 25% by weight, especially of between 25% and 35% by weight, for example of between 25% and 30% by weight.

According to an advantageous embodiment of the process of the invention, the product obtained on conclusion of the disintegrating step exhibits a solids content of from 15% to 30% by weight, and preferably of from 18% to 29% by weight and preferentially from 26% to 29% by weight.

Generally, in the process of the invention, the solids content of the silica cake or suspension, before and after disintegrating, can be identical or can be slightly different. It has been found that, advantageously, the disintegrating step carried out at a high temperature, namely of between 50 and 120° C., makes it possible to avoid having to add water, while reducing the mechanical energy to be provided in order to obtain an identical viscosity.

Likewise, it has been found that the disintegrating step carried out at a high temperature can make it possible to be able to operate with solids contents which are rather high and even higher than in a disintegrating step carried out at ambient temperature. The drying step is found to be facilitated thereby, insofar as there is less water to be removed. It has thus been found that the process according to the invention makes it possible to improve the productivity, in particular of the drying step.

In addition, it has been found that, advantageously, the mechanical energy necessary in the disintegrating step at high temperature of the process of the invention is preferably less than that employed in a disintegrating step at ambient temperature, for one and the same high solids content of the cake. Consequently, the suspension of precipitated silica (S2) obtained proves to be milled to a lesser extent and thus the quality of the precipitated silica obtained is not substantially modified.

The process according to the invention relates to a process for the synthesis of precipitated silica, that is to say that first a precipitation step is carried out in which at least one acidifying agent is reacted with at least one silicate, without limitation to a specific type of precipitated silica.

The process according to the invention can be carried out in particular for the preparation of precipitated silicas as obtained according to the processes described, for example, in the applications EP 0 520 862, EP 0 670 813, EP 0 670 814, EP 0 917 519, WO 95/09127, WO 95/09128, WO 98/54090, WO 03/016215, WO 2009/112458 or WO 2012/010712.

The precipitation reaction by reaction of a silicate with an acidifying agent can be carried out in the process according to the present invention according to any method of preparation, in particular by addition of an acidifying agent to a vessel heel of silicate, or else by simultaneous addition, total or partial, of acidifying agent and of silicate to a vessel heel of water, or of silicate or of acidifying agent.

The choice of the acidifying agent and of the silicate is made in a way well known per se. Use is generally made, as acidifying agent, of a strong inorganic acid, such as sulfuric acid, nitric acid or hydrochloric acid, or also of an organic acid, such as acetic acid, formic acid or carbonic acid.

There is obtained, on conclusion of the precipitation step, a suspension (or slurry) S1 of precipitated silica, to which it is optionally possible to add various additives, which is subsequently separated.

According to a specific embodiment of the invention, the abovementioned separation step consists of a solid/liquid separation step. Preferably, it consists of a filtration step, on conclusion of which a filtration cake is obtained, if appropriate followed by a step of washing said cake.

The filtration can be carried out according to any suitable method, for example using a filter press, a belt filter or a rotary vacuum filter.

The product (cake) obtained is subsequently subjected to the disintegrating step as described above.

According to one embodiment, the process of the invention can optionally comprise a lump-breaking step between the separation step and the disintegrating step.

This optional step consists in crumbling the cake resulting from the separation step and makes it possible to reduce the particle size of the filtration cake. For example, this step can be carried out with a Gericke Nibbler, in which the cake is forced through a screen with a diameter of less than 20 mm, preferably with a size of between 2 and 14 mm. This lump-breaking step can also be carried out with Wyssmont devices, such as the "Rotocage Lumpbreaker", the "Double Rotocage Lumpbreaker" or the "Triskelion Lumpbreaker".

The suspension of precipitated silica S2 obtained on conclusion of the disintegrating step is subsequently dried.

This drying can be carried out according to any means known per se.

According to a preferred embodiment of the process of the invention, the drying is carried out by atomization.

To this end, use may be made of any type of suitable atomizer, in particular a turbine atomizer, preferably a nozzle atomizer, a liquid pressure atomizer, or a two-fluid atomizer.

When the drying operation is carried out by means of a nozzle atomizer, the precipitated silica capable of then being obtained by the process according to the invention is advantageously in the form of substantially spherical beads (micropearls), preferably with a mean size of at least 80 µm.

On conclusion of this drying operation, it is optionally possible to carry out a milling (in particular dry milling) step on the product recovered; the precipitated silica then obtained generally exists in the form of a powder, preferably with a mean size of between 5 and 70 µm.

When the drying operation is carried out by means of a turbine atomizer, the precipitated silica capable of then being obtained can exist in the form of a powder, for example with a mean size of between 5 and 70 µm.

Likewise, the dried, in particular when it exists in the powder form, or milled product can optionally be subjected to an agglomeration step, which consists, for example, of a direct compression, a wet granulation (that is to say, with use of a binder, such as water, silica suspension, and the like), an extrusion or, preferably, a dry compacting. When the latter technique is employed, it may prove to be advisable, before carrying out the compacting, to deaerate (operation also referred to as predensification or degassing) the pulverulent products so as to remove the air included therein and to ensure more uniform compacting.

The precipitated silica capable of being obtained on conclusion of this agglomeration step generally exists in the form of granules, in particular with a size of at least 1 mm, in particular of between 1 and 10 mm, especially along the axis of their greatest dimension.

The following examples illustrate the invention without, however, limiting the scope thereof.

EXAMPLES

Starting Materials Used cake of precipitated silica Z1165MP, having a solids content of 27% by weight, obtained in the filtration step,
sodium aluminate solution, exhibiting a concentration, expressed as $Al_2O_3$, of 23% and an $Na_2O/Al_2O_3$ ratio by weight of 0.8,
sulfuric acid with a concentration equal to 80 g/l.

Monitoring Criteria

Particle sizing by sedimentation carried out on the Sedigraph 55100 device (Micromeretics) from the percentage of particles of less than 0.5 µm. The suspension analyzed by this technique is diluted to 4.6% by weight in purified water and it is gently stirred. The suspension obtained is subsequently sieved using a 250 µm sieve and the analysis is carried out taking a measurement range between 0.3 and 85 µm.

Particle sizing by laser diffraction carried out on a Mastersizer 2000 device (Malvern), diluting in the measurement region with purified water, the obturation of the beam being between 8 and 13%.

Energy dissipated in the disintegrating by the stirring on a Zanchetta granulator.

The disintegrating step is carried out on the Zanchetta granulator ("high shear three-bladed" granulator dryer with electric torque measurement).

Each disintegrated cake exiting from the Zanchetta granulator is sieved at 800 µm and then monitored for solids content, Malvern laser particle sizing and Sedigraph particle sizing.

Disintegrating Procedure disintegrating at 1000 revolutions/min, temperature-regulated vessel (at 25° C. or 80° C.)
at t=0: bringing the aluminate into contact with 1 kg of cake (the cake being crumbled beforehand through a 4 mm sieve) preheated at 80° C. for 3 hours in a sealed bag (in the case where the vessel is subsequently regulated at 80° C.), resulting in an $Al/SiO_2$ ratio of 0.3% by weight,
at t=7 min: adjustment of the pH with addition of sulfuric acid for 1 minute,
end of the disintegrating at 30 minutes: the product is subsequently passed through an 800 µm sieve.

TABLE 1

| Test | Temperature (° C.) | SC* (%) | Mechanical energy at 200 s (J) | Time at the intensity peak (s) | Mechanical energy after 30 minutes (J) |
|---|---|---|---|---|---|
| 1 | 25 | 28.4 | 34 300 | 44 | 107 000 |
| 2 | 25 | 27.4 | 30 600 | 32 | 112 700 |
| 3 | 80 | 28.6 | 19 450 | 19 | 99 000 |
| 4 | 80 | 28.8 | 17 300 | 19 | 103 700 |

SC*: solids content

Tests 1 and 2 are comparative tests corresponding to a disintegrating step carried out at ambient temperature (25° C.), with high solids contents.

It is shown that tests 3 and 4 in accordance with the invention, in which the disintegrating step is carried out at 80° C., require less mechanical energy than tests 1 and 2 carried out at ambient temperature, for comparable high solids content levels. This is because the energies dissipated at 200 s are 30 600 and 34 300 J in tests 1 and 2, against only 17 300 and 19 450 J in tests 3 and 4 in accordance with the invention.

Likewise, in tests 3 and 4 according to the invention, the cumulative energy dissipated over the disintegrating step is significantly reduced (mechanical energy after 30 minutes).

Furthermore, the time at the intensity peak, which corresponds to the change from the solid state of the cake to the liquid state, is longer in comparative tests 1 and 2 than in tests 3 and 4 according to the invention. Thus, the disintegrating step under the conditions of the invention requires less energy to change to the liquid state than during a disintegrating step carried out at ambient temperature, for high solids contents.

TABLE 2

| Test | Temperature (° C.) | SC (%) | Laser particle sizing d50 (µm) | Sedigraph % d < 0.5 µm | Sedigraph % d < 1 µm | Sedigraph % d < 1.5 µm |
|---|---|---|---|---|---|---|
| 1 | 25 | 28.4 | 11.8 | 79.9 | 88.0 | 90.9 |
| 2 | 25 | 27.3 | 14.2 | 79.4 | 85.7 | 88.6 |

TABLE 2-continued

| Test | Temperature (° C.) | SC (%) | Laser particle sizing d50 (μm) | Sedigraph % d < 0.5 μm | % d < 1 μm | % d < 1.5 μm |
|---|---|---|---|---|---|---|
| 3 | 80 | 28.6 | 20.3 | 63.6 | 69.2 | 72.5 |
| 4 | 80 | 28.8 | 18.8 | 64.2 | 73.2 | 77.0 |

It is found that the content of fines (% of particles having a diameter (d) of less than 0.5 μm) is lower in tests 3 and 4 in which the disintegrating step is carried out at 80° C., in comparison with the content of fines obtained in tests 1 and 2 in which the disintegrating step is carried out at 25° C. The products were milled to a lesser extent in the disintegrating step at 80° C. than in the disintegrating step at 25° C., for comparable solids contents.

The invention claimed is:

1. A process for preparing precipitated silica, the process comprising:
   reacting a silicate with an acidifying agent in order to obtain a suspension of precipitated silica (S1),
   separating the precipitated silica (S1) from the suspension in order to obtain a cake,
   disintegrating said cake in order to obtain a suspension of precipitated silica (S2), and
   drying the suspension of precipitated silica (S2),
wherein the disintegrating step is carried out at a temperature of between 75 and 120° C., wherein the disintegrating step comprises adding mechanical energy to the cake.

2. The process as claimed in claim 1, wherein the disintegrating step comprises addition of steam.

3. The process as claimed in claim 1, wherein the disintegrating step comprises a heating step, optionally preceded by a step of preheating the cake.

4. The process as claimed in claim 1, wherein the duration of the disintegrating step is between 5 and 120 minutes.

5. The process as claimed in claim 1, wherein the filtration cake subjected to the disintegrating step exhibits a solids content of at least 10% by weight.

6. The process as claimed in claim 1, wherein the suspension of precipitated silica (S2) resulting from the disintegrating step exhibits a solids content of at least 10% by weight.

7. The process as claimed in claim 1, wherein the separation step consists of a filtration step, optionally followed by a washing step.

8. The process as claimed in claim 7, wherein the filtration step is carried out using a rotary vacuum filter or a filter press.

9. The process as claimed in claim 1, wherein the drying step is carried out by atomization.

10. The process as claimed in claim 1, wherein the product resulting from the drying step is subjected to a milling step.

11. The process as claimed in claim 1, wherein the product resulting from the drying step is subjected to an agglomeration step.

12. The process as claimed in claim 1, wherein the filtration cake subjected to the disintegrating step exhibits a solids content of between 10% and 40% by weight.

13. The process as claimed in claim 1, wherein the suspension of precipitated silica (S2) resulting from the disintegrating step exhibits a solids content of between 10% and 40% by weight.

14. The process as claimed in claim 10, wherein the product resulting from the milling step is subjected to an agglomeration step.

* * * * *